United States Patent
Huitt et al.

(10) Patent No.: US 6,972,384 B2
(45) Date of Patent: Dec. 6, 2005

(54) INTERNET SCALE

(75) Inventors: Bruce Huitt, Woodruff, SC (US); Kenneth Bauman, Spartanburg, SC (US); Christopher Gubitose, Simpsonville, SC (US); Mroz Wieslaw, Spartanburg, SC (US)

(73) Assignee: Mettler-Toledo, Inc., Columbus, OH (US)

( * ) Notice: Subject to any disclaimer, the term of this patent is extended or adjusted under 35 U.S.C. 154(b) by 339 days.

(21) Appl. No.: 09/917,183

(22) Filed: Jul. 27, 2001
(Under 37 CFR 1.47)

(65) Prior Publication Data

US 2003/0024745 A1 Feb. 6, 2003

(51) Int. Cl.[7] .......................................... G01G 19/414
(52) U.S. Cl. .................. 177/25.13; 702/173; 705/407; 705/414
(58) Field of Search ............... 702/173–175; 705/407, 414–416; 177/25.11–25.19

(56) References Cited

U.S. PATENT DOCUMENTS

| | | | | |
|---|---|---|---|---|
| 5,533,917 A | * | 7/1996 | Schmitz | 439/894 |
| 5,548,722 A | * | 8/1996 | Jalalian et al. | 709/220 |
| 5,678,005 A | * | 10/1997 | Taylor | 709/224 |
| 5,983,209 A | * | 11/1999 | Kara | 705/407 |
| 6,024,607 A | * | 2/2000 | Wahl | 439/639 |
| 6,064,981 A | * | 5/2000 | Barni et al. | 705/26 |
| 6,249,778 B1 | * | 6/2001 | Vaghi | 705/407 |
| 6,356,882 B1 | * | 3/2002 | Carroll et al. | 705/401 |
| 6,426,471 B1 | * | 7/2002 | Gubitose | 177/25.15 |
| 6,566,613 B1 | * | 5/2003 | Gesuita et al. | 177/25.18 |
| 6,649,849 B2 | * | 11/2003 | Bass et al. | 177/25.15 |
| 2002/0066602 A1 | * | 6/2002 | Bliss et al. | 177/25.13 |
| 2003/0168259 A1 | * | 9/2003 | Miller et al. | 177/25.15 |

* cited by examiner

Primary Examiner—Randy W. Gibson
(74) Attorney, Agent, or Firm—Jeffrey Furr

(57) ABSTRACT

The invention disclosed consists of an Internet scale, which is comprised of a weighing platform with an integrated Internet connection/browser means. This scale will allow the connectivity and communication with the Internet or Intranet without the use of a separate Internet connection means. It will have the ability to take a weight from a weighing apparatus, update an HTML form automatically with the new weight value and obtain the new charge/cost for the specified method of shipment from an Internet server. The Internet scale will act as an Internet appliance and perform communication with the Internet and peripherals required for a small footprint shipping system.

2 Claims, 6 Drawing Sheets

INTERNET SCALE

CROSS-REFERENCES TO RELATED APPLICATIONS (IF ANY)

None

STATEMENT AS TO RIGHTS TO INVENTIONS MADE UNDER FEDERALLY-SPONSORED RESEARCH AND DEVELOPMENT (IF ANY)

None

BACKGROUND

1. Field of the Invention

This invention relates to the art of weighing scales, and more specifically to weighing scales utilized for communication of information dealing with weighing letters and small packages therefor.

2. Description of Prior Art

The current method to relay information dealing with the weight of packages or items to be shipped or processed is to have a separate weighing platform and Internet communications device. This system is expensive, labor-intensive and has the potential for the introduction of errors based on human keying errors.

In the field of carrier delivery services, the current practice is to provide two-way electronic communications with customers to transmit package level detail before the parcel is picked up. The package level detail includes things like service level (next day, second day, etc.), delivery address, origination address, weight, dimensions, transit status, delivery confirmation, detailed account status and special services. The current art is for the carriers to have a personal computer at their customers' sites. Some carriers are finding it burdensome and expensive to maintain personal computers and peripheral at their customers' sites, especially at sites that ship fewer than 20 daily packages.

In the field of using scales to measure the amount of ingredients or components to mix to produce a product, information for changes in mixing ratios are provided and inputted by hand. This allows the introduction of human error and, once again, adds additional steps to process, even when this information is available electronically or over the Internet.

The reduction in the costs and the need for a stand alone personal computer while allowing a faster, less expensive, less labor intensive and more efficient access of the Internet when dealing with weighing of items, products, ingredients and/or packages shows that there is still room for improvement within the art.

SUMMARY OF THE INVENTION

An object of the present invention is to provide an inexpensive and efficient communication means between scale users and the Internet. The Internet scale is a scale that consists of a weighing platform with an Internet connection/browser means. The Internet connection/browser means is directly connected to the scale.

The inventors of the present invention have reduced the costs and the need for a stand alone personal computer while allowing a faster, less expensive, less labor intensive and more efficient access of the Internet when dealing with weighing of items, products, ingredients and/or packages. The Internet scale will act as an Internet appliance and perform communication with the Internet and peripherals required for a small footprint shipping system. The Internet scale development will not involve the development of a new scale platform but will communicate with existing scale platforms. The Internet scale being developed will allow the operator to weigh a parcel then enter all information required to ship and track that parcel through an Internet connection/browser. Further the operator will be allowed to print bar coded shipping labels using an attached label printer and interface to printers for report generation. Features such as those in PC based shipping products could be supported.

When or in dealing with carrier delivery services it will satisfy both the needs of shippers and the end-users of shippers' requirements. The system will be connected to the Internet. One of the most exciting concepts is that this will be a true two-way communications conduit. The shipper and users will be able to transmit messages (information, editorial, and advertisements) to customers and the customers can respond or passively absorb the information. This invention will allow flexibility by providing device interfaces that create a family of products that are interchangeable, expandable, and built around the same platform.

Some specific advantages are the ability to take a weight from a weighing apparatus, update an HTML form automatically with the new weight value and obtain the new charge/cost for the specified method of shipment from an Internet server once an operator presses a "submit" button and the ability to take a dynamically changing weight from a weighing apparatus, update an HTML form dynamically with the new weight value and obtain the new charge/cost for the specified method of shipment from an Internet server, thus requiring no user intervention to resubmit the form with new weight information.

In yet another aspect of the invention, the Internet scale can be a scale that measures out ingredients to make a final product. It will have the ability to look up the ingredients' required weights from an Internet site, thereby reducing the amount of man-time required and the chance to introduce human errors.

The Internet scale is more efficient, effective, accurate and functional than the current art.

BRIEF DESCRIPTION OF THE DRAWING

Without restricting the full scope of this invention, the preferred form of this invention is illustrated in the following drawings.

DESCRIPTION

Definitions:

BOOTP Bootstrap Protocol.

CCFT: Cold Cathode Fluorescent Tube

CGI: Common Gateway Interface
CHAP: Challenge Handshake Authentication Protocol
DHCP: Dynamic Host Configuration Protocol
FTP: File Transfer Protocol
HTML: HyperText Markup Language
IETF: Internet Engineering Task Force
ISP: Internet Service Provider
NVM Non-Volatile Memory
PAP: Password Authentication Protocol
RARP: Reverse Address Resolution Protocol
RFC: Request for Comments
TCP/IP: Transport Control Protocol/Internet Protocol Preferred Embodiment The preferred embodiment of the invention is a weighing platform connected to an Internet connection with the capability to serve as an Internet browser.

Figure 1:
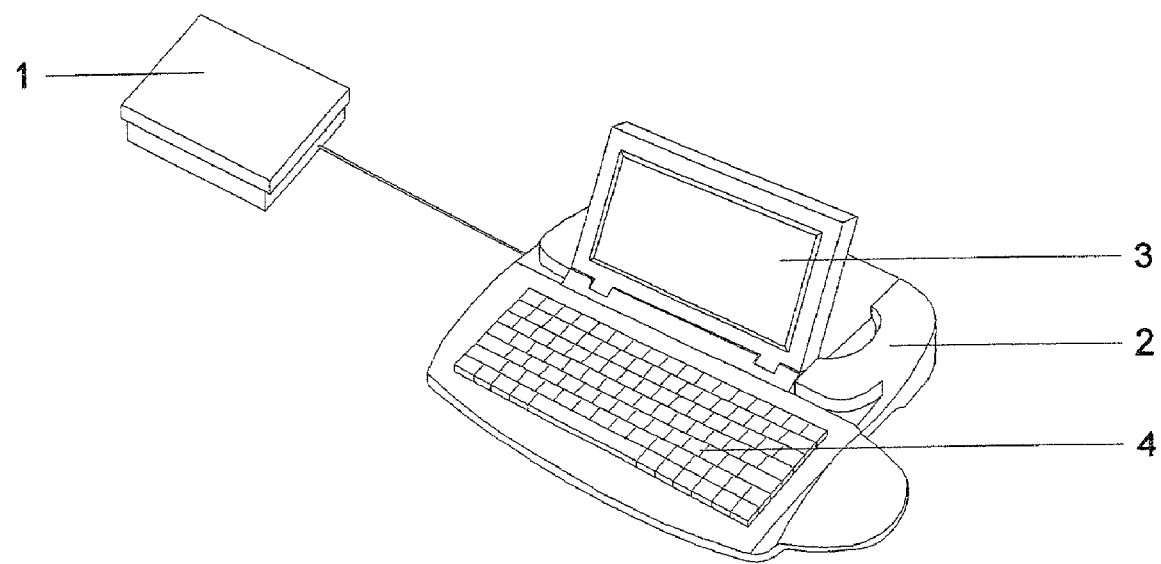
FIG. 1 shows a front view of the Internet scale.

Referring initially to FIG. 1, the major components of the Internet scale are the weighing platform 1, controller 2, monitor 3 and keyboard 4.

Figure 2:
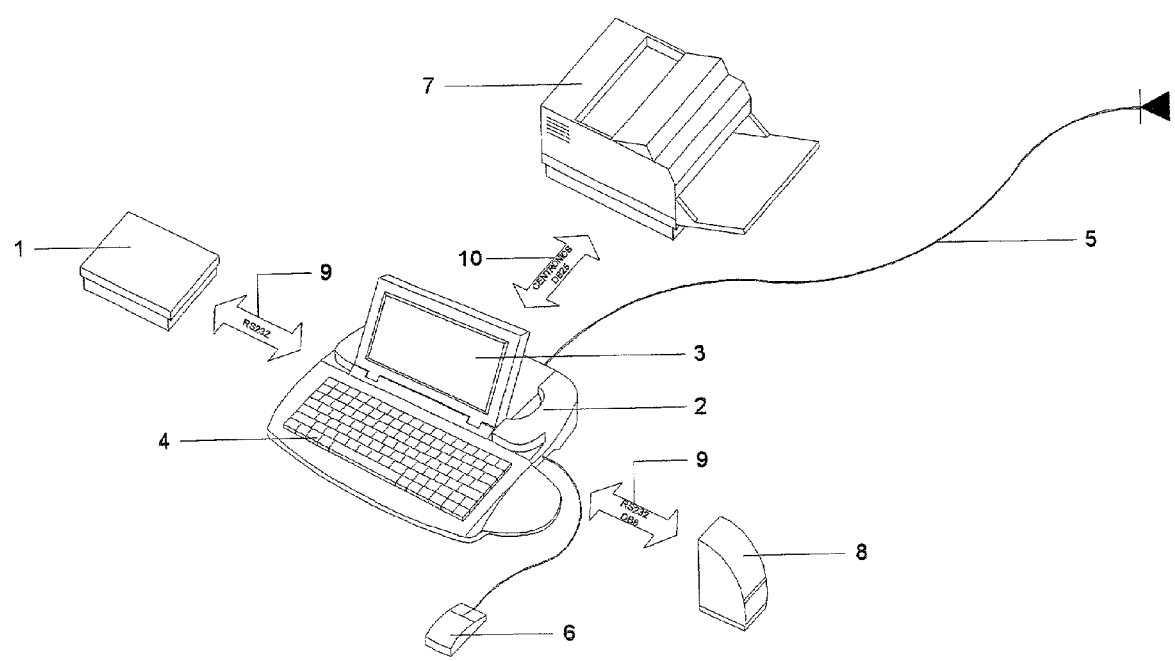
FIG. 2 shows the typical configuration of the Internet scale with the peripherals

The major peripheral components of the Internet scale are the Internet connection 5, the mouse 6, printer 7 and label printer 8 with the RS232 9 and centronics 10 connections as shown in the connection diagram in FIG. 2.

Figure 3:
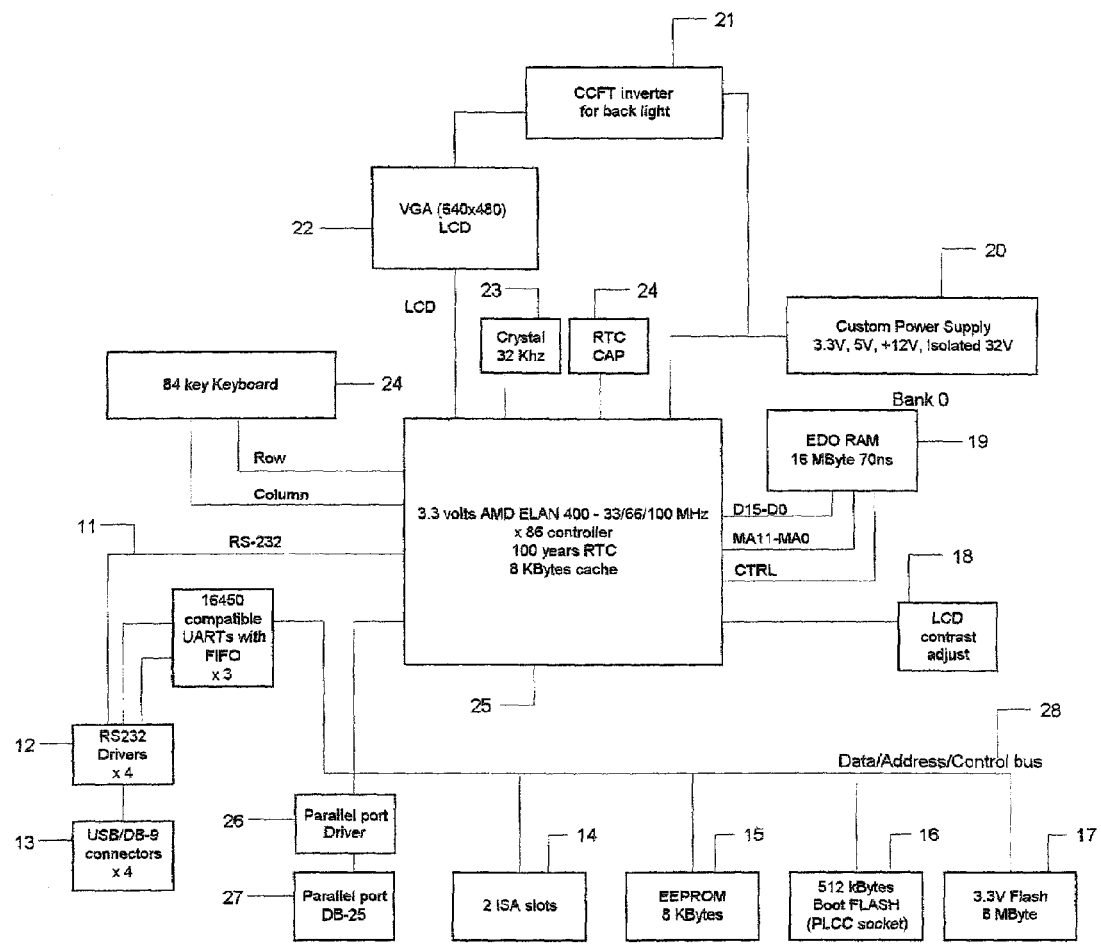
FIG. 3 shows a block diagram of the Internet scale.

A block diagram of the controller 2 is shown in the next FIG. 3. The AND Elan 400 25 is the processing power of the controller 2. It has numerous RS-232 11 connections utilizing RS232 drivers 12 and USB/DB-9 connectors 13 It also utilizes a pareller port driver 26 for the parrellel port DB-25 27. It is connected to a 84 key keybooard 24, the VGA LCD 22, 32 Khz crystal 23, RTC CAP 24, custom power supply 20, EDO DRAM 19 and LCD contrast adjust 18. The custom power supply 20 is also connected to the CCFT inverter for back light 21 which is connected to the VGA LCD 22. The AMD Elan 400 24 uses a data/address/control bus 28 through which connects the ISA slot(s) 14, the EEPROM 15, the Boot FLASH memory 16 and flash memory 17. The a data/address/control bus 28 also connects to the 16450 compatible UARTs which has a connection to the RS232 drivers 12.

The controller 2 will be configured such that operators can not improperly place cables. All connections will be through the rear of the controller 2. There are two connectors that are the same and these will autoconfigure in software.

Figure 4:
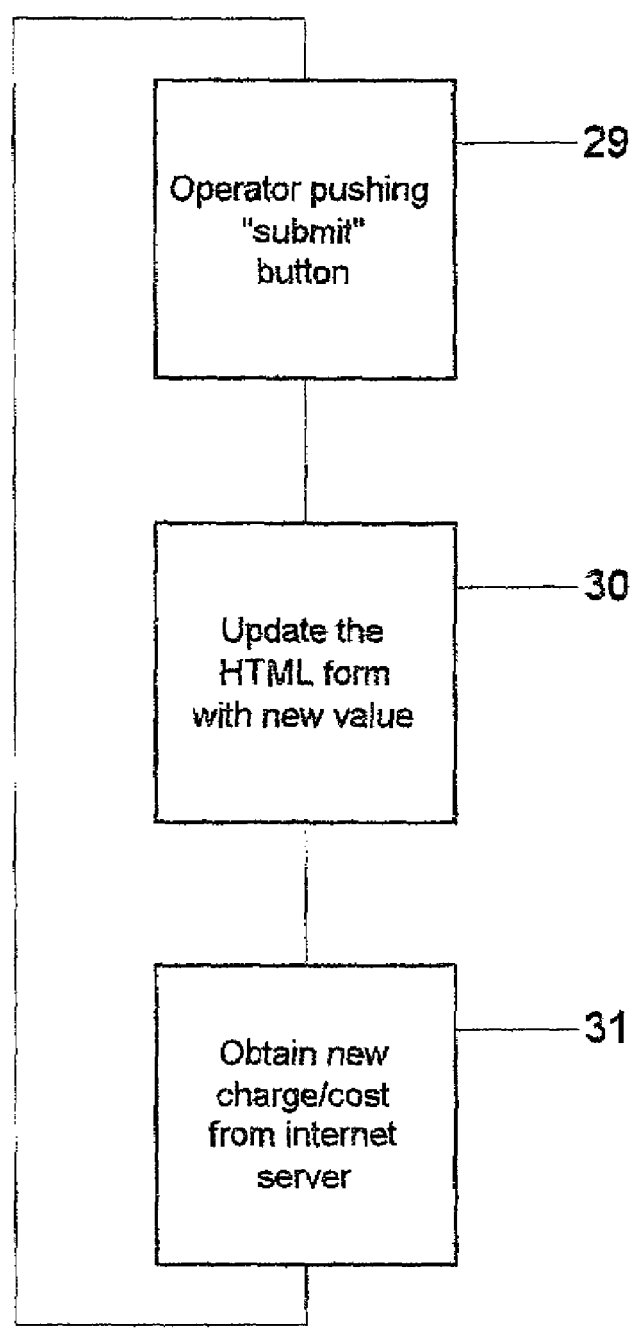
FIG. 4 shows the process flow diagram for the getting and retrieving of information from the Internet with operator control.

As shown in the flowchart in FIG. 4, once an operator presses a "submit" button 29, the internet scale will have the ability to take a weight from the weighing platform 1, update an HTML form automatically with the new weight value 30 and obtain the new charge/cost for the specified method of shipment from an Internet server 31.

Figure 5:
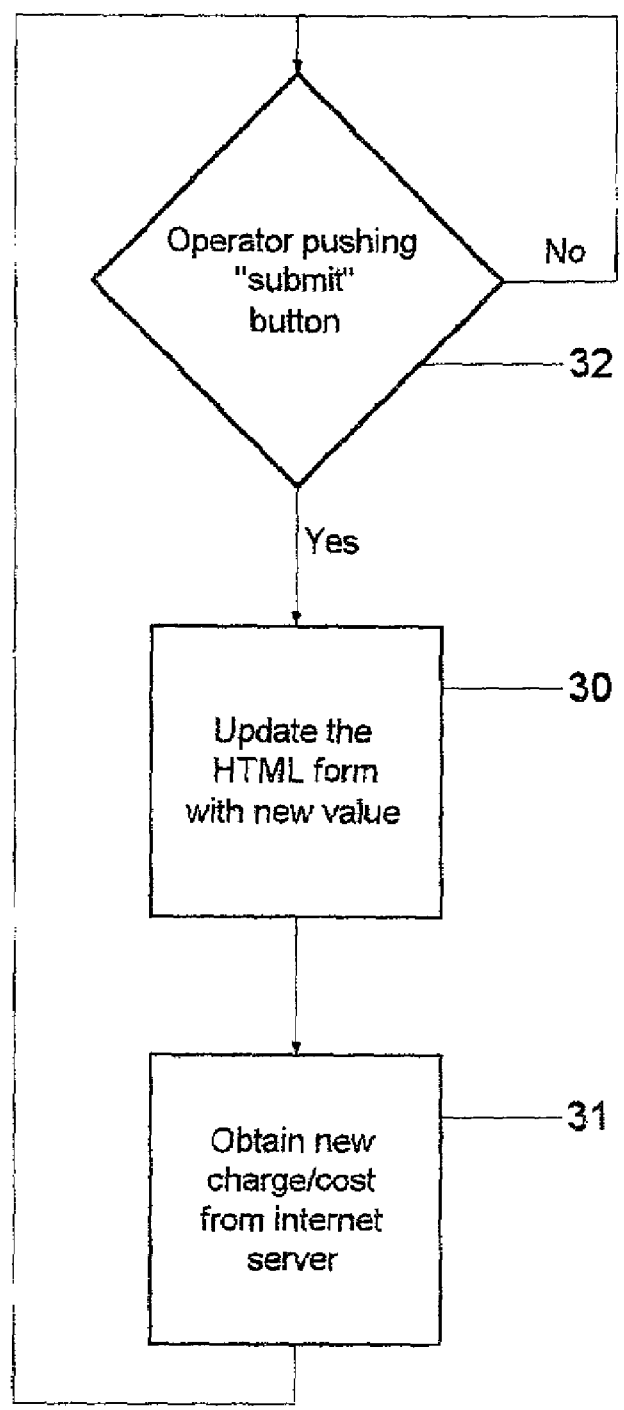
FIG. 5 shows the process flow diagram for the getting and retrieving of information from the Internet dynamically when the weight on the scale changes.

As shown in the flowchart in FIG. 5, the Internet scale will have the ability to take a dynamically changing weight from the weighing platform 1 if there has been a change in weight 32, update an HTML form dynamically with the new weight value 30 and obtain the new charge/cost for the specified method of shipment from an Internet server, thus requiring no user intervention to resubmit the form with new weight information.

Through the Internet scale's Internet connection 5, shipper and users will be able to transmit messages (information, editorial, and advertisements) to customers and the customers can respond or passively absorb the information. This includes capability to send and receive E-mail manually and automatically.

The Internet scale interface and metrological performance of the system will be determined by the scale family that is connected and not based upon the controller 2. Each weighing platform 1 type will require:
1) a method of determining if connected or not
2) Scale calibration for non-sealed applications
3) Entry of Geo code for 1-step units.

The weighing platform's 1 communication to the controller 2 is via a 9-pin female D sub-miniature connector employing RS-232C signal levels. Industry standard protocols will be used.

The preferred CPU & OS for the controller 2 is the AMD Elan SC 400 25 The AMD Elan SC 400 25 provides a number of integrated features that make this chip a very effective cost alternative to the much higher cost processors on the market. The Elan is essentially an Intel x486 but with numerous embedded features. The Elan is completely compatible with the Intel instruction set. QNX is one of the lowest cost and best performing RTOS and Browsing technologies on the market. QNX provides a powerful GUI interface and numerous visual components for application (i.e. scale-side) development. The OS features are combined in a rich user interface development environment called PhaB (Photon Application Builder). PhaB provides a very powerful, object oriented, visual developments environment for defining the user interface. Voyager is the browser technology and it is fully built under the PhaB environment The Voyager browser also supports JavaScript and full HTML forms, meaning that some of the application that runs on the controller 2 can be developed independent of the platform. Additionally, the QNX operating system provides Slinger, an internal web server, which supports CGI and server-push technologies which will be required to provide dynamic HTML content. CGI responses can be either served by Slinger or from a server running at a remote site. CGI is supported so that scripts can be developed and executed by the internal server to supply a response to the internal browser if needed. This flexibility will allow the required connection time to the ISP to be limited only to pages that absolutely require connection to the remote site.

QNX provides true Memory management of tasks such that the lockups seen with other OS's do not occur in the Internet scale. The operator will always have a way to recover from an error condition.

The Internet connection 5 will use the following hardware interfaces. The preferred approach uses an ISA card that is right angle mounted through a daughter board to the main board. The daughter card simply provides a connection to the main ISA slot 14 and a connector to plug-in the ISA card. Only 1 of the ISA slots will be populated when the production units are built and it will be configured with either a standard modem or ethernet ISA card.

While chip sets are mentioned below, standard ISA cards will be used in the design to provide the Internet connection 5. The Internet scale will have one ISA card installed either modem or Ethernet; however, the system software will allow both to be installed. It is assumed that the majority of users today are thought to primarily need analog modem solutions and they will use their own ISP.

The Serial modem is as follows. POTs interface at up to V.34bis (33.6 kbps). The specific implementation of the modem will be initially based upon an ISA card. Current costing of modem ISA cards using the Rockwell chip set appear to be much cheaper than any solution identified. At a later date, dedicated on-board chip sets based upon the TI5420 DSP will be considered. General Datacom is developing firmware for this DSP and currently has 14.4 k baud up and going but not 28.8 kbps needed in this design. For on-board chip sets, a universal DAA arrangement will be selected such as the Silicon Labs DAA to provide simplicity in using the Internet scale internationally.

The connections to internal LANs will occur through an Ether10BaseT ISA card. Connections into 100BaseT networks will require an intermediate Hub to step up to 100 megabits/sec.

In the preferred embodiment, the assignment of IP addresses will be allowed through use of Dynamic Host Configuration Protocol (DHCP), or Bootstrap Protocol (BOOTP) server to assign IP addresses. Other assignments may be used BOOTP protocol supplies the computer's LP address, address of router, and address of server.

The issues listed above do not relate to a modem connection since the ISP provides the gateway to the Internet and the operator will need to fill out his IP address by entering it into the internet scale NVM through the Scale IP address setup menu item.

An address book, which is a small database for frequently used addresses being shipped to, will be maintained. The addresses will contain all information needed to ship to the destination along with the shipping method. The number of addresses will be maintained as the last 100 addresses shipped to. Flash memory 17 will be used to hold the address book. Users will be able to search based upon city, zip, name, etc. Databases will be held for the shipper (i.e. "From:") and recipient (i.e. "To:").

Examples of HTML pages/user screens that do not require the internet connection are: Scale configuration and setup, address book storage and lookup and shipment logs. These pages must be developed and handled within the application and will not be supported on the web site since these interact directly with the on-board flash file system.

Internet connection time is one issue that has to be considered in the overall design of software since establishing the ISP connection takes a number of seconds and an operator should not be forced to wait to ship a package while this occurs. To limit the connection time problem the time to connect to the Internet through an ISP for those sites that do not have a permanent connection to the Internet must be limited. Users that connect to an ISP through the on-board modem must connect before they can complete the transaction, receive tracking numbers, costs or drop-off locator maps. In order to limit the time of making the connection to the Internet, the controller 2 will dial-out in background mode as soon as the operator begins the process of a package shipment. Failures to connect due to either a busy line or time-out on the request will produce an error only at the appropriate time and not during the user's data entry.

For the monitor 3, an industry standard monitor will be used. The monitor 3 will have high enough resolution to monitor locator drop-off maps. Scaleable Fonts will be provided with text modes of 40, 64, 80 columns and characters 16, 10, 8 pixels wide and variable heights up to 32 lines. Simple "GIF" files will be supported again within the constraints of the physical monitor size.

A standard laptop style keyboard 4 will be designed into the Internet scale.

A Microsoft serial mouse 6 is supported in the design and is planned for the Internet scale. An alternative is to make the monitor a touch screen.

An industry standard printer 7 will be used, which will be supported through a centronics 10 interface.

The preferred label printer 8 is a standard printer with a standard DB9 13, RS232 11 and centronics parallel printer port 27. This printer prints bar-coded labels in 2" and 4" size. A serial connection is used due to the lower cost but can support the parallel port option as well. The plan is currently to integrate the printer within the controller housing. The commands to the printer are through an RS232 interface 9 and are well documented in the industry.

The controller 2 will be AC powered and its custom supply will be a Power General Custom Power Supply 20 that provides. 3 3, 5, +12 VDC. Supply voltage for attached printers will be their own sources.

Customers will require an ISP provider for the Internet scale to be usable and either an Ethernet connection to a gateway or a dedicated analog phone line.

Figure 6:
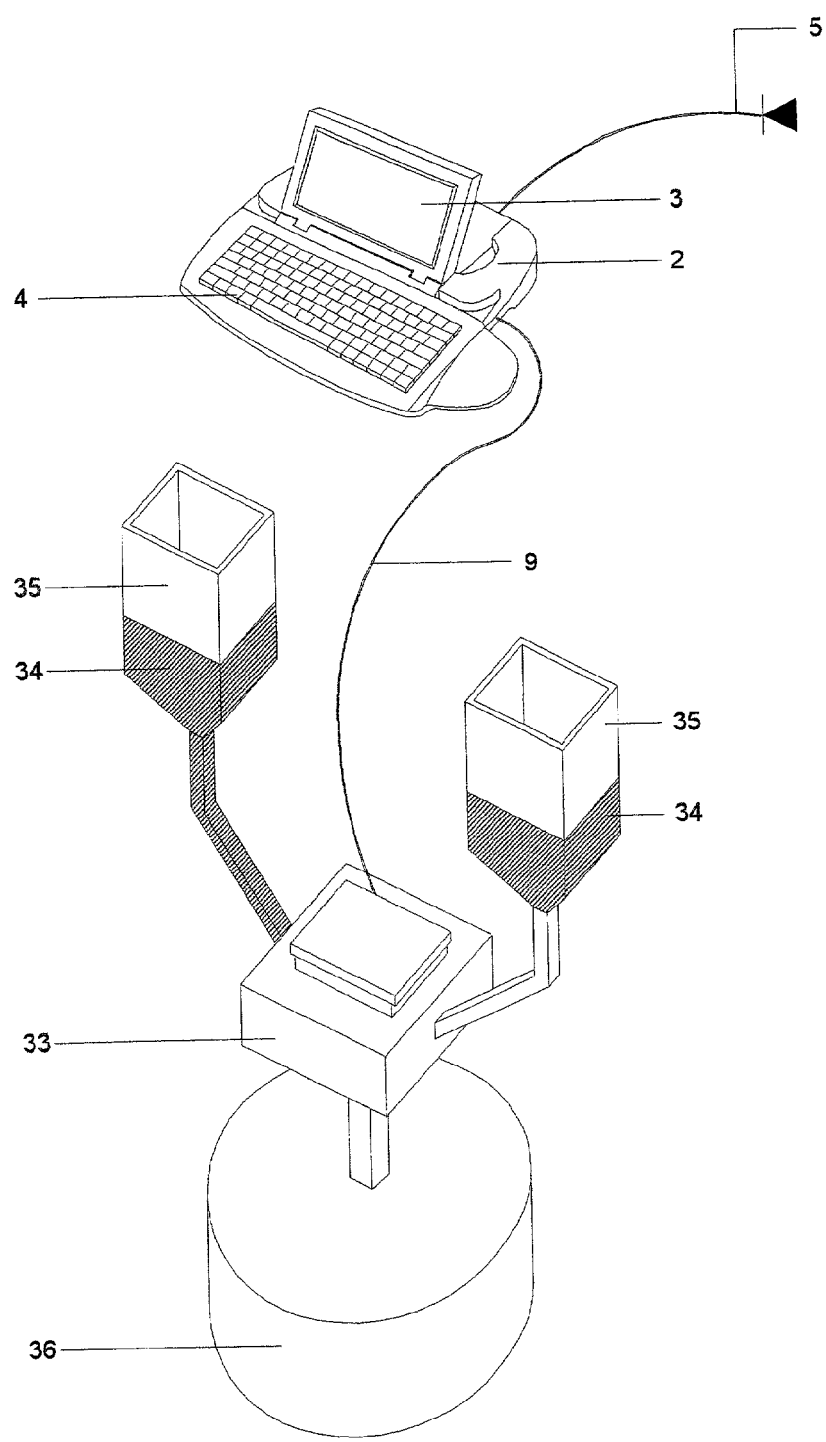
FIG. 6 shows a scale that controls the mixture of ingredients with a connection to the Internet.

As mentioned earlier the system design allows 16 megabytes of EDO DRAM 19 and 8 meg of Flash memory 17. The SC400 reference designs currently host 8 meg of flash memory 17 and the initial application (i.e. PS60 Scale connection and Voyager browser) is contained within that space. Therefore it is felt that even with the additional requirement to support E-Mail (i.e. V-Mail) that we should have acceptable space at 8 meg. The design uses an embedded flash file system that will also hold the address look-up data Additional Embodiments One additional embodiment is shown in FIG. 6. This embodiment has the controller 2 connected to the Internet connection 5 and bulk weighing platform 33. The bulk weighing platform 33 is used to measure different amounts of ingredients 34 that are in the material bins 35. The ingredients are mixed together in the mixing bin 36 to form a final product. The controller 2 uses the Internet connection 5 to correctly identify the correct weights for the processing of the final ingredients for the final product. The controller 2 will forward this information on to the bulk weighing platform 33. The bulk weighing platform 33 is a scale that is common in the industry for this type of processing.

Yet another additional embodiment is with a modem on the same motherboard as the controller.

Yet another additional embodiment is to use an Intranet environment either instead of, or in tandem with, the Internet.

Operation

There are no special considerations for installation. The Internet scale flash is upgradable at any time using the connection to the Internet.

The Internet scale operation can be updated at any time by changing the Internet scales internal HTML pages that are held in the 8 Meg of flash memory 17. Pages that do not need to be retrieved directly from an Internet site will be contained within the flash 17 memory of the scale, which allows a connection to occur only as necessary At scale boot time (i.e. power-up) the scale will query the designated carrier site to see if new pages are required to operate the Internet scale. FTP will be used to download these new HTML pages into the Internet scale's flash memory 17, allowing updates to occur whenever needed.

Advantages

The previously described version of the present invention has many advantages. The intent is to develop a product that allows a faster, less expensive, less labor intensive and more efficient transmission of information back and forth through and access of the Internet when dealing with weighing of items, products, ingredients or packages The present invention adds to the efficiency and productiveness of the process.

Although the present invention has been described in considerable detail with reference to certain preferred versions thereof, other versions are possible. For example, the internet scale could use a different or new protocol to communicate or the web browser may be detachable from the scale or different types of information may be communicated or it could be used in an Intranet environment. Therefore, the point and scope of the appended claims should not be limited to the description of the preferred versions contained herein.

That which is claimed:

1. A scale comprising:
a weighing platform connected to a controller wherein the controller will transmit data in a background mode where said controller will be configured such that an operator can not improperly place cables with a plurality of connections through the rear of said controller; and which contains an Internet browsing means to transmit and receive data through an Internet connection, where the changing of the weight on the weighing platform activates the transmission of the weight data through an Internet connection.

2. A scale comprising:
a weighing platform connected to a controller wherein the controller will transmit data in a background mode where said controller will be configured such that an operator can not improperly place cables with a plurality of connections through the rear of said controller, and which contains an Internet browsing means to transmit and receive data through an Internet connection, where the changing of the weight on the weighing platform activates the transmission of the weight data through an Internet connection, and the new data is the cost for a specified method of shipment.

* * * * *